United States Patent
Beckman et al.

(10) Patent No.: US 10,160,541 B1
(45) Date of Patent: Dec. 25, 2018

(54) CIRCUMFERENTIALLY-DRIVEN PROPULSION MECHANISM

(71) Applicant: Amazon Technologies, Inc., Seattle, WA (US)

(72) Inventors: Brian C. Beckman, Newcastle, WA (US); Menashe Haskin, Kfar Vitkin (IL); Atishkumar Kalyan, Seattle, WA (US); Louis LeRoi LeGrand, III, Seattle, WA (US); Michael Rolnik, Geva Binyamin (IL); Ricky Dean Welsh, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 307 days.

(21) Appl. No.: 14/866,557

(22) Filed: Sep. 25, 2015

(51) Int. Cl.
*B64C 39/02* (2006.01)
*B64C 27/08* (2006.01)
*B64C 27/20* (2006.01)

(52) U.S. Cl.
CPC ............ *B64C 39/024* (2013.01); *B64C 27/08* (2013.01); *B64C 27/20* (2013.01); *B64C 2201/108* (2013.01)

(58) Field of Classification Search
CPC .......................... B64C 27/20; B64C 2201/108
See application file for complete search history.

(56) References Cited

U.S. PATENT DOCUMENTS

| | | | | |
|---|---|---|---|---|
| 4,807,830 A | * | 2/1989 | Horton ................ | B64C 39/001 244/12.2 |
| 5,340,279 A | * | 8/1994 | Cycon .................... | B64C 27/20 416/134 A |
| 5,364,230 A | * | 11/1994 | Krauss .................. | B64C 27/20 416/134 A |
| 7,032,861 B2 | * | 4/2006 | Sanders, Jr. ........... | B64C 27/12 244/12.1 |
| 7,410,123 B2 | * | 8/2008 | Nunnally ............... | B64C 27/20 244/23 C |
| 8,752,787 B2 | * | 6/2014 | Ruan ..................... | B64C 27/20 244/12.2 |
| 2005/0082421 A1 | * | 4/2005 | Perlo ..................... | A63H 27/12 244/12.2 |
| 2016/0304193 A1 | * | 10/2016 | Marcel .................. | B64C 27/08 |

* cited by examiner

*Primary Examiner* — Philip J Bonzell
*Assistant Examiner* — Michael B. Kreiner
(74) *Attorney, Agent, or Firm* — Athorus, PLLC (57) ABSTRACT

Described is an unmanned aerial vehicle ("UAV") that includes a lifting propulsion mechanism that is circumferentially-driven and includes a propeller assembly and a propeller rim enclosure. The propeller assembly includes a plurality of propeller blades that extend radially and are coupled to an inner side of a substantially circular propeller rim that encompasses the propeller blades. Permanent magnets are coupled to an outer side of the propeller rim. The propeller rim and the magnets are positioned within a cavity of the propeller rim enclosure such that the propeller rim will rotate within the propeller rim enclosure. Also within the cavity of the propeller rim enclosure are electromagnets that are used to cause the propeller rim to rotate.

18 Claims, 8 Drawing Sheets

CIRCUMFERENTIALLY-DRIVEN PROPULSION MECHANISM

BACKGROUND

Many unmanned aerial vehicles ("UAV") utilize outrunner brushless motors to drive propellers to lift and maneuver the UAV. The typical brushless motor includes a stator in which electromagnets are positioned around the perimeter of the stator. A rotor, or can, is positioned and rotates around the stator. A shaft extends from the rotor to which a propeller is coupled. An electronic speed control provides current to the electromagnets that cause the rotor to rotate about the stator. The shafts of brushless motors wear-out due to stress on the shaft caused by movements (pitch, yaw, and roll) of the UAV, because the movements (and stresses) are not parallel with the shaft.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. Additionally, as used herein, the term "coupled" may refer to two or more components connected together, whether that connection is permanent (e.g., welded) or temporary (e.g., bolted), direct or indirect (e.g., through an intermediary), mechanical, chemical, optical, or electrical. Furthermore, as used herein, "horizontal" flight refers to flight traveling in a direction substantially parallel to the ground (e.g., sea level), and that "vertical" flight refers to flight traveling substantially radially outward from the earth's center. It should be understood by those having ordinary skill that trajectories may include components of both "horizontal" and "vertical" flight vectors.

DETAILED DESCRIPTION

This disclosure describes a UAV that includes a circumferentially-driven lifting propulsion mechanism that can be used to lift a UAV such that the perceived gravitational force acting on the UAV is approximately zero. In one implementation, the lifting propulsion mechanism is mounted at or near the center of the UAV and the lifting propulsion mechanism may generate a force with a lifting propeller that is approximately equal and opposite to a force applied to the UAV as a result of gravity (referred to herein as gravitational force). Rather than using a traditional brushless motor that includes a central shaft to which one or more propellers are mounted, the lifting propulsion mechanism may be circumferentially-driven and not include a shaft and the propellers are incorporated into the lifting propulsion mechanism.

For example, the lifting propulsion mechanism may include a propeller assembly and a propeller rim enclosure. The propeller assembly may include a plurality of propeller blades that extend radially. An end of each of the propeller blades are coupled to an inner side of a propeller rim that is substantially circular and encompasses or surrounds a perimeter of the plurality of propeller blades. A plurality of magnets is coupled to an outer side of the propeller rim.

The propeller rim enclosure is configured to encompass the propeller rim so that the propeller rim, and thus, the connected propellers, can rotate with respect to the propeller rim enclosure. For example, the propeller rim enclosure includes a perimeter wall that is substantially circular in shape and has a diameter that is larger than the diameter of the propeller rim. One or more side walls may extend inward from an upper edge and a lower edge of the perimeter wall to form a cavity into which the propeller rim and magnets coupled to the outer side of the propeller rim are positioned. A plurality of bearings, rails, or other guides, generally referred to herein as propeller rim guides, may also be positioned in the cavity to secure the propeller rim and allow the propeller rim to rotate with respect to the propeller rim enclosure.

Coupled to an inner side of the perimeter wall of the propeller rim enclosure is a plurality of electromagnets. Current may be applied to the electromagnets by a lifting propulsion mechanism controller to control the rotational speed of the propeller rim and the connected plurality of propeller blades. As the propeller rim and connected propeller blades rotate, the propeller blades generate a lifting force. The lifting force will cause the UAV to become airborne and remain at an altitude.

In some implementations, to stabilize and/or maneuver the UAV, one or more maneuverability propulsion mechanisms may be included and used to generate other forces that cause the UAV to pitch, roll, and/or yaw. The maneuverability propulsion mechanism may be configured in a similar manner compared to the lifting propulsion mechanism and/or may include other forms of propulsion, such as traditional brushless motors with a shaft and propeller, jets, etc.

Because the lifting propulsion mechanism can generate a force that is approximately equal to and opposite the gravitational force applied to the UAV, the forces to be applied to the UAV by the maneuverability propulsion mechanisms may be determined without considering the full effect of the gravitational force on the UAV.

The implementations described herein increase the efficiency of the UAV and allow the maneuverability propellers to operate in a wider range of rotational speeds, angles, pitches, and/or directions. For example, the lifting propulsion mechanism may be larger in size than the maneuverability propulsion mechanism(s) and selected based on the mass of the UAV and any anticipated payload. In one implementation, the lifting propulsion mechanism may be selected such that it is operating within its most efficient range when causing the propeller blades to generate a force that is approximately equal to and opposite the gravitational force applied to the UAV.

During transport, UAVs often need different capabilities (e.g., maneuverability, power efficiency) depending on their position and/or their profile. For example, when a UAV is landing, taking off, or in an area with many objects (e.g., a dense area such as a neighborhood, street, etc.), the UAV needs to be agile so that it can avoid colliding with other objects (stationary and/or moving). In comparison, when a UAV is at a high altitude, traveling at a high velocity (e.g., at a cruising altitude), in an area where there are no or few objects, efficiency and power conservation are desirable.

By designing the lifting propulsion mechanism such that the magnets and electromagnets that cause rotation of the propeller blades are at the perimeter of the propeller blades, the leverage is increased compared to traditional brushless motors and thus, the force needed to generate the same amount of torque is less. Specifically, the lever arm is increased. In a traditional shafted brushless motor, the lever arm, which is approximately the radius of the propeller shaft, is small, thereby requiring a large torque to generate the desired force from the propellers. In comparison, with the implementations discussed herein, the lever arm is approximately the radius of the propeller rim. Because the lever arm is larger, the torque required to generate the same force is reduced. By reducing the needed torque, the magnets and/or the electromagnets may be smaller and/or lighter weight. Likewise, there is a greater surface area on which to place the magnets and the electromagnets.

The lifting propulsion mechanism provides a primary purpose of providing lift and power efficiency to the UAV. In comparison, the maneuverability propulsion mechanism(s) may be configured with smaller, more agile motors, and the propellers may be smaller propellers designed for providing high agility and maneuverability for the UAV. In one example, the maneuverability propulsion mechanism(s) may be traditional center shafted brushless motors. The maneuverability propulsion mechanism(s) provide a primary purpose of guiding the UAV and providing high agility when needed. For example, when high agility is needed, the lifting propulsion mechanism may be shut down and the UAV may be navigated using the maneuverability propulsion mechanisms. In comparison, when agility is not as important and power efficiency is desirable, the lifting propulsion mechanism may be engaged to provide lift to the UAV. The maneuverability propulsion mechanisms may then be operated at a lower power draw and/or some of the maneuverability motors may be stopped.

In addition to, or as an alternative to utilizing a lifting propulsion mechanism in combination with maneuverability propulsion mechanism(s), the position of one or more of the propulsion mechanisms may be adjustable with respect to the body of the UAV. For example, one or more of the maneuverability propulsion mechanisms and/or the lifting propulsion mechanism(s) may be horizontally, vertically, and/or rotationally moved with respect to the body of the UAV while the UAV is in flight. In one implementation, the motor arms (discussed below) may be rotated, thereby rotating the maneuverability propulsion mechanisms with respect to the body of the UAV.

While the examples discussed herein primarily focus on UAVs in the form of an aerial vehicle utilizing multiple propellers to achieve flight (e.g., a quad-copter, octo-copter), it will be appreciated that the implementations discussed herein may be used with other forms and/or configurations of aerial vehicles and need not be unmanned.

As used herein, a "materials handling facility" may include, but is not limited to, warehouses, distribution centers, cross-docking facilities, order fulfillment facilities, packaging facilities, shipping facilities, rental facilities, libraries, retail stores, wholesale stores, museums, or other facilities or combinations of facilities for performing one or more functions of materials (inventory) handling. A "delivery location," as used herein, refers to any location at which one or more inventory items (also referred to herein as a payload) may be delivered. For example, the delivery location may be a person's residence, a place of business, a location within a materials handling facility (e.g., packing station, inventory storage), or any location where a user or inventory is located, etc. Inventory or items may be any physical goods that can be transported using a UAV.

Figure 1:
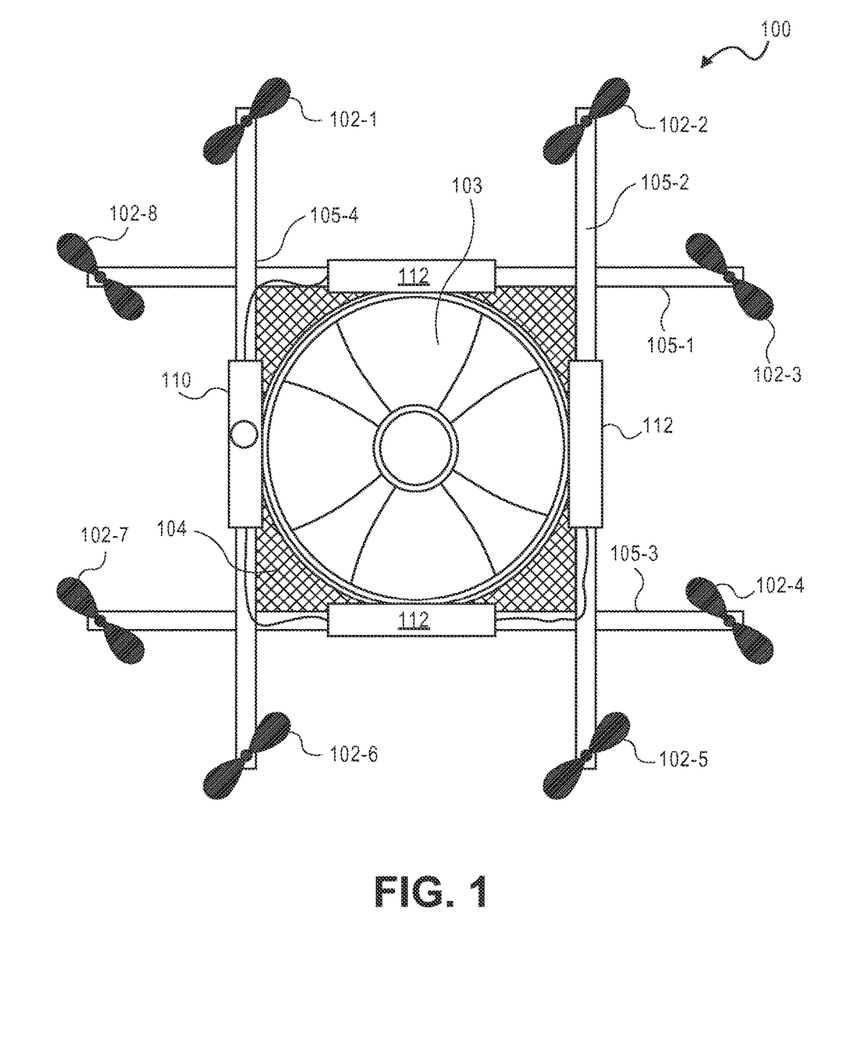
FIG. 1 is a block diagram of a top-down view of a UAV, according to an implementation.

FIG. 1 illustrates a block diagram of a top-down view of a UAV 100, according to an implementation. The UAV 100 includes eight maneuverability propulsion mechanisms 102-1, 102-2, 102-3, 102-4, 102-5, 102-6, 102-7, 102-8 spaced about a body 104 of the UAV 100. The maneuverability propulsion mechanisms 102, in this example, are center shafted brushless motors with propellers coupled to the shafts. The propeller may be any form (e.g., graphite, carbon fiber) and of a size sufficient to lift and/or guide the UAV 100 and any payload engaged by the UAV 100 so that the UAV 100 can navigate through the air, for example, to deliver a payload to a delivery location. In addition to the maneuverability propulsion mechanisms 102, the UAV 100 includes a lifting propulsion mechanism 103.

The lifting propulsion mechanism 103 is of a size and configuration to generate a force that is approximately equal and opposite to the gravitational force applied to the UAV 100. For example, if the mass of the UAV, without a payload, is 20.00 kilograms (kg), the gravitational force acting on the UAV is 196.20 Newtons (N). If the UAV is designed to carry a payload having a mass between 0.00 kg and 8.00 kg, the lifting propulsion mechanism may be configured such that when generating a force between 196.00 N and 275.00 N, it is operating in its most power efficient range.

To counteract the angle of momentum of the lifting propulsion mechanism 103, the maneuverability propulsion mechanisms 102 may rotate in a direction opposite that of the lifting propulsion mechanism 103 to keep the UAV 100 from rotating with the rotation of the propeller assembly of the lifting propulsion mechanism 103.

While this example includes eight maneuverability propulsion mechanisms and a lifting propulsion mechanism, in other implementations, more or fewer maneuverability propulsion mechanisms, and/or lifting propulsion mechanism may be utilized. Likewise, in some implementations, the propulsion mechanisms may be positioned at different locations on the UAV 100 and/or at different angles with respect to the body of the UAV 100. For example, rather than or in addition to rotating the propellers of the maneuverability propulsion mechanisms 102 in a direction opposite the rotation of the propellers of the lifting propulsion mechanism 103, one or more of the maneuverability propulsion mechanisms may be titled at an angle with respect to the lifting propulsion mechanism 103 to generate an angle of momentum at an amount approximately equal and opposite to that generated by the lifting propulsion mechanism 103.

Alternative methods of propulsion may also be utilized for either or both of the lifting propulsion mechanism and/or maneuverability propulsion mechanisms. For example, fans, jets, turbojets, turbo fans, jet engines, and the like may be used to propel the UAV. Additional details for an implementation of a lifting propulsion mechanism are discussed further below with respect to FIGS. 3-5

The body 104 or housing of the UAV 100 may likewise be of any suitable material, such as graphite, carbon fiber, and/or aluminum. In this example, the body 104 of the UAV 100 includes four rigid members 105-1, 105-2, 105-3, 105-4, or beams, also referred to herein as motor arms, arranged in a hash pattern with the rigid members intersecting and joined at approximately perpendicular angles. In this example, rigid members 105-1 and 105-3 are arranged parallel to one another and are approximately the same length. Rigid members 105-2 and 105-4 are arranged parallel to one another, yet perpendicular to rigid members 105-1 and 105-3. Rigid members 105-2 and 105-4 are approximately the same length. In some implementations, all of the rigid members 105 may be of approximately the same length while, in other implementations, some or all of the rigid members may be of different lengths. Likewise, the spacing between the two sets of rigid members may be approximately the same or different.

While the implementation illustrated in FIG. 1 includes four rigid members 105 that are joined to form the body 104 and corresponding motor arms, in other implementations, there may be fewer or more components to the body 104. For example, rather than four rigid members, in other implementations, the body 104 of the UAV 100 may be configured to include six rigid members. In such an example, two of the rigid members 105-2, 105-4 may be positioned parallel to one another. Rigid members 105-1, 105-3 and two additional rigid members on either side of rigid members 105-1, 105-3 may all be positioned parallel to one another and perpendicular to rigid members 105-2, 105-4. With additional rigid members, additional cavities with rigid members on all four sides may be formed by the body 104. A cavity within the body 104 may be configured to include a payload engagement mechanism for the engagement, transport, and delivery of item(s) and/or containers that contain item(s) (generally referred to herein as a payload).

In some implementations, the UAV may be configured for aerodynamics. For example, an aerodynamic housing may be included on the UAV that encloses the UAV control system 110, one or more of the rigid members 105, the body 104, and/or other components of the UAV 100. The housing may be made of any suitable material(s) such as graphite, carbon fiber, aluminum, etc. Likewise, in some implementations, the location and/or the shape of the payload (e.g., item or container) may be aerodynamically designed. For example, in some implementations, the payload engagement mechanism may be configured such that, when the payload is engaged, it is enclosed within the body and/or housing of the UAV 100 so that no additional drag is created during transport of the payload by the UAV 100. In other implementations, the payload may be shaped to reduce drag and provide a more aerodynamic design of the UAV and the payload. For example, if the payload is a container and a portion of the container extends below the UAV when engaged, the exposed portion of the container may have a curved shape.

The maneuverability propulsion mechanisms 102 are positioned at both ends of each rigid member 105. The maneuverability propulsion mechanisms may be any form of motor capable of generating enough speed with the propellers to lift the UAV 100 and any engaged payload thereby enabling aerial transport of the payload. Likewise, the maneuverability propellers may be of any material and size sufficient to provide lift and maneuverability to the UAV. For example, the maneuverability propellers may be 10 inch-12 inch diameter carbon fiber propellers.

The lifting propulsion mechanism 103 is positioned toward a center of the body 104 of the UAV. Example configurations of the lifting propulsion mechanism 103 are discussed further below with respect to FIGS. 3-5. As noted above, in some implementations, the lifting propulsion mechanism may be selected such that it operates within its most efficient range when generating a force sufficient to maintain the UAV and any attached payload at a commanded altitude.

Mounted to the body 104 is the UAV control system 110. In this example, the UAV control system 110 is mounted to one side and on top of the body 104. The UAV control system 110, as discussed in further detail below with respect to FIG. 8, controls the operation, routing, navigation, communication, lifting propulsion mechanism control, maneuverability propulsion mechanism control, and the payload engagement mechanism of the UAV 100.

Likewise, the UAV 100 includes one or more power modules 112. In this example, the UAV 100 includes three power modules 112 that are removably mounted to the body 104. The power module for the UAV may be in the form of battery power, solar power, gas power, super capacitor, fuel cell, alternative power generation source, or a combination thereof. The power module(s) 112 are coupled to and provide power for the UAV control system 110, the propulsion mechanisms, and the payload engagement mechanism.

In some implementations, one or more of the power modules may be configured such that it can be autonomously removed and/or replaced with another power module while the UAV is landed. For example, when the UAV lands at a delivery location, relay location and/or materials handling facility, the UAV may engage with a charging member at the location that will recharge the power module.

As mentioned above, the UAV 100 may also include a payload engagement mechanism (not shown). The payload engagement mechanism may be configured to engage and disengage items and/or containers that hold items. In this example, the payload engagement mechanism is positioned beneath the body of the UAV 100. The payload engagement mechanism may be of any size sufficient to securely engage and disengage containers that contain items. In other implementations, the payload engagement mechanism may operate as the container, containing the item(s). The payload engagement mechanism communicates with (via wired or wireless communication) and is controlled by the UAV control system 110.

While the implementations of the UAV 100 discussed herein utilize propellers to achieve and maintain flight, in other implementations, the UAV may be configured in other manners. For example, the UAV may include fixed wings and/or a combination of both propellers and fixed wings. For example, the UAV may utilize one or more propulsion mechanisms that include propellers to enable vertical takeoff and landing and a fixed wing configuration or a combination wing and propeller configuration to sustain flight while the UAV is airborne.

Figure 2:
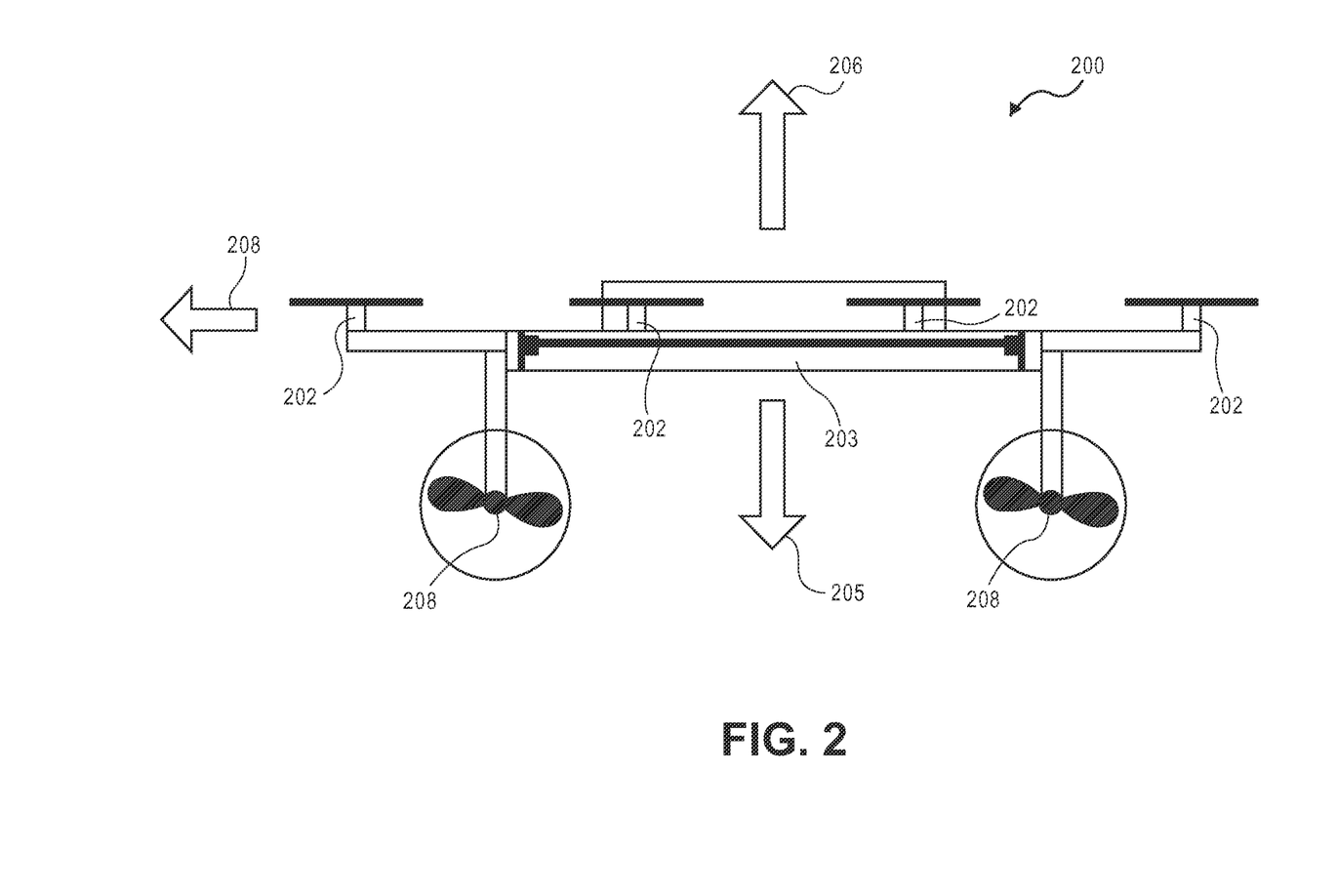
FIG. 2 is a block diagram of a side view of a UAV illustrating the forces generated and/or applied to the UAV, according to an implementation.

FIG. 2 is a block diagram of a side view of a UAV 200 illustrating the forces generated and/or applied to the UAV, according to an implementation. The UAV 200 includes a plurality of maneuverability propulsion mechanisms 202 that are configured to stabilize and maneuver the UAV 200 by generating directional forces. Likewise, the UAV 200 includes a lifting propulsion mechanism 203 configured to generate a vertical force sufficient to lift and maintain the UAV at an altitude.

As identified above, one or more of the maneuverability propulsion mechanisms 202 may include propellers that rotate in a direction opposite to the rotation of the propellers of the lifting propulsion mechanism 203 to generate an angle of momentum that is opposite to that of the lifting propulsion mechanism 203 to stabilize the UAV 200. Alternatively, one or more of the maneuverability propulsion mechanisms 202 may be titled or offset such that it rotates on a different plane than the lifting propulsion mechanism 203 and generates an angle of momentum that is offset to the angle of momentum generated by the lifting propulsion mechanism 203.

In another implementation, the UAV 200 may include one or more stability propulsion mechanisms 208. In one implementation, the UAV 200 may include two stability propulsion mechanism 208. The stability propulsion mechanism 208 may be positioned to generate forces in a plane that is substantially orthogonal to the rotational plane of the lifting propulsion mechanism 203 and/or the maneuverability propulsion mechanisms 202 so that the stability propulsion mechanism(s) generate an angle of momentum that is approximately equal and opposite to the angle of momentum generated by the rotation of the lifting propulsion mechanism 203 and/or the maneuverability propulsion mechanisms 202. Likewise, the stability propulsion mechanism(s) 208 may be positioned on opposing ends of the UAV 200, as illustrated, and oriented so they rotate in opposite directions with respect to one another, thereby balancing the rotational forces in the orthogonal plane in which they are rotating.

Continuing with the above example, if the mass of the UAV, without payload, is 20.00 kilograms (kg) the gravitational force 205 acting upon the UAV is 196.133 Newtons (N). If the UAV is designed to carry a payload having a mass between 0.00 kg and 8.00 kg, the lifting propulsion mechanism 203 may be configured such that when generating a force between 196.00 N and 275.00 N, it is operating in its most power efficient range. To keep the UAV at an approximately steady altitude (e.g., hover), the vertical force 206 generated by the lifting propulsion mechanism 203 is approximately equal and opposite the gravitational force 205. When in hover, the lifting propulsion mechanism 203 may include propellers that rotate at a speed sufficient to generate a vertical force 206 that is approximately equal and opposite to the gravitational force 205 and the propellers of the maneuverability propulsion mechanisms may periodically rotate to generate forces sufficient to stabilize the UAV 200 when other forces (e.g., wind) act upon the UAV.

In some implementations, one or more of the maneuverability propulsion mechanisms 202 may be disengaged. Likewise, the direction of rotation of one or more of the maneuverability propulsion mechanisms 202 may be altered to generate either a positive vertical force or a negative vertical force. In another example, the pitch of one or more of the maneuverability propulsion mechanisms 202 and/or the lifting propulsion mechanism 203 may be altered to increase or decrease the generated force without altering the rotational speed of the propellers. In still another example, the angle of one or more of the maneuverability propulsion mechanisms and/or the lifting propulsion mechanism may be altered to generate directional forces other than vertical. The angle of the propulsion mechanisms may be altered by altering the pitch and/or roll of the UAV 200 and/or by altering the angle of the propulsion mechanism with respect to the body of the UAV 200.

In traditional UAV configurations, if a maneuver command is received instructing the UAV 200 to move in a horizontal direction 208, the forces to be generated by each of the motor and propeller pairs is determined that considers not only the direction of movement but also the gravitational force. For example, in a traditional UAV, if the UAV receives a maneuver command to travel in a horizontal direction 208 with a velocity of 20.0 meters/second (m/s) and without changing altitude, the sum of all the forces acting on the UAV must be considered and a force determined for each of the propellers and motors.

To determine the force to be generated by each of the propellers (assuming no other environmental forces), the directional force needed to move the UAV 200 can be separated into horizontal and vertical components. In this example, the gravitational force 205 is 196.133 N in the negative direction. As such, a positive vertical force of 196.133 N is needed to maintain the current altitude of the UAV. The horizontal force needed to move the UAV 200 at a velocity of 20.0 m/s second can be determined from the following equation:

$$F_h = C_d * \frac{\rho * v^2}{2} * A$$

where $C_d$ is the drag coefficient, p is the density of the air, v is velocity, A is the presented area of the UAV, also referred to as the reference area, and $F_h$ is the horizontal force. The drag coefficient, a dimensionless number, includes all the complex dependences such as air conditions, shape of the UAV, inclination of the UAV, form drag, skin friction drag, wage drag, and induced drag. The drag coefficient therefore depends on the configuration of the UAV, among other variables, and may be determined through experimentation and/or during navigation as part of a command feedback. For purposes of this discussion, we will assume that the drag coefficient is 0.10. Density of air depends on the temperature and the particles in the air. Assuming dry air at a temperature of 20 degrees Celsius, the density is 1.2041 kg/m$^3$. Finally, the presented area of the UAV depends on the pitch, roll, size, and shape of the UAV. For this example, we will assume the presented area is 0.5 m$^2$.

Using the above factors, the horizontal force can be computed as:

$$F_h = 0.1 * \frac{1.2041 * 20^2}{2} * 0.5 = 12.041 N$$

Summing the vertical force (196.133 N) and the horizontal force (12.041 N), the UAV must generate a total force ($F_t$) of 196.502 N ($F_v^2 + F_h^2 = F_t^2$).

While such a system provides high agility and maneuverability for the UAV, distributing the total forces needed to control the UAV among all the propellers results in the motors frequently not operating within their most efficient ranges, thereby resulting in an inefficient use of power.

With the implementations described herein, the lifting propulsion mechanism 203 can be configured such that when the vertical force generated by the lifting propulsion mechanism 203 is 196.133 N the lifting propulsion mechanism 203 is operating in its most efficient range. When a maneuver command is received instructing the UAV 200 to move in the horizontal direction 208 at a speed of 20.0 m/s, the horizontal force of 12.041 N can be determined and distributed among one or more of the maneuverability propulsion mechanisms 202. For example, if the maneuverability propulsion mechanisms 202 are at their most efficient range when generating 6.00 N of force, the angle of two of the maneuverability propulsion mechanisms may be altered to be approximately ninety degrees with respect to the UAV 200 and the total horizontal force of 12.041 N distributed between those two maneuverability propulsion mechanisms 202, thereby propelling the UAV 200 in the commanded direction in a more efficient manner. The remaining maneuverability propulsion mechanisms may be disengaged or periodically engaged to stabilize the UAV 200.

As can be seen from a comparison of the traditional UAV, which requires the total force to be distributed among all the propellers, and the implementations described herein, which allocate the vertical force to a lifting propulsion mechanism and allocate the remaining horizontal force of only 12.041 N to the maneuverability propulsion mechanisms, there is a much larger range of operational values available to the maneuverability propulsion mechanisms. The increased operational range for the maneuverability propulsion mechanisms allows greater operational efficiency in maneuvering the UAV 200.

By separating the vertical force from the horizontal force to be generated by the UAV, the total force to be generated by the maneuverability propulsion mechanisms 203 is greatly reduced. Likewise, the computations to be performed by corresponding propulsion mechanism controllers (e.g., electronic speed controls) are simplified. For example, the lifting propulsion mechanism controller only needs to compute the force necessary for lifting the UAV. Likewise, the maneuverability propulsion mechanism controllers for the maneuverability propulsion mechanisms only need to compute the forces necessary to stabilize and maneuver the UAV 200.

In some implementations, one or more of the propulsion mechanism controllers may include a feedback component that provides information to other propulsion mechanism controllers. For example, the maneuverability propulsion mechanism controllers may provide feedback to the lifting propulsion mechanism controller identifying the forces generated by the maneuverability propulsion mechanisms and the lifting propulsion mechanism controller may utilize this information to increase and/or decrease the force generated by the lifting propulsion mechanism 203. For example, in some implementations, the control signals sent to the maneuverability propulsion mechanisms may be selected so that the maneuverability propulsion mechanisms operate within the most efficient ranges when maneuvering the UAV. In such an implementation, the forces generated by the maneuverability propulsion mechanisms may be determined and the lifting propulsion mechanism may rotate at a speed necessary to provide any additional lift needed to maintain the UAV at an intended altitude and/or to alter the altitude of the UAV.

In comparison, the lifting propulsion mechanism controller may provide feedback information to the maneuverability propulsion mechanism controllers identifying the lifting force generated by the lifting propulsion mechanism. The maneuverability propulsion mechanism controllers may utilize this information to adjust the perceived gravitational force applied to the UAV when computing forces for generating maneuvers or altering the attitude of the UAV 200.

In other implementations, rather than altering the angle of one or more of the maneuverability propulsion mechanisms, the angle of the UAV 200 may be altered to navigate in the desired direction. In such an implementation, the lifting propulsion mechanism and the engaged maneuverability propulsion mechanisms will be generating both horizontal and vertical forces to move the UAV in the desired direction, but the majority of the vertical force will be provided by the lifting propulsion mechanism. In still other implementations, rather than, or in addition to altering the rotational speed of the propulsion mechanisms, the pitch of the propellers included in the propulsion controllers may be altered to either increase or decrease the force generated by the propellers. Likewise, in some implementations, the direction of rotation of one or more of the maneuverability propulsion mechanisms may be altered to alter the direction of generated force. For example, if the angle of the UAV is to be altered, the directional rotation of one or more of the maneuverability propulsion mechanisms on one side of the UAV 200 may rotate in a direction opposite to the maneuverability propulsion mechanisms located on the opposing side of the UAV 200, thereby altering the angle of the UAV 200. As will be appreciated, any combination of rotational speed, pitch, angle, and/or direction may be utilized to propel the UAV 200.

Figure 3:
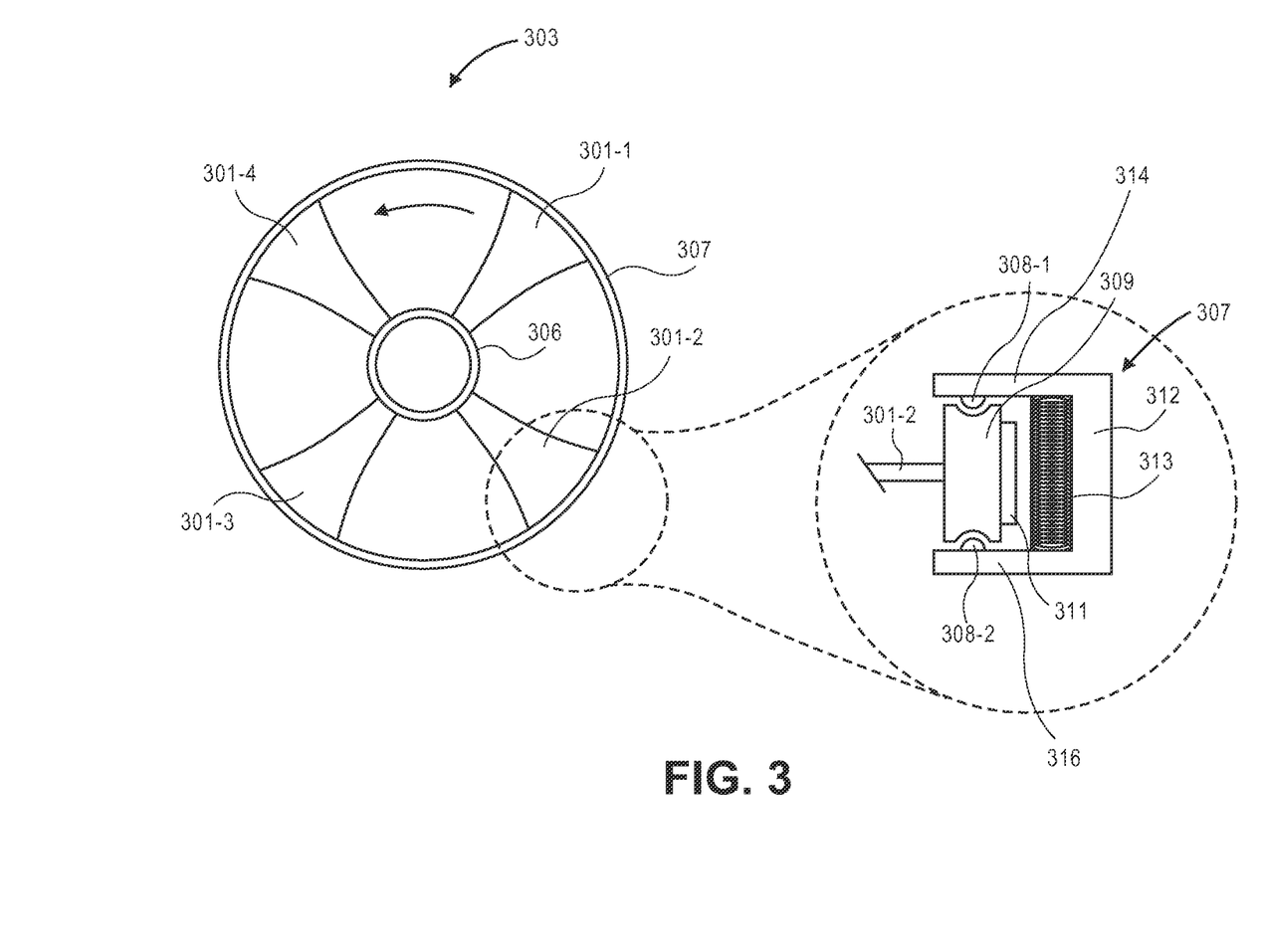
FIG. 3 is a block diagram of a top-down view of a circumferentially-driven propulsion mechanism, according to an implementation.

FIG. 3 is a block diagram of a top-down view of a circumferentially-driven propulsion mechanism, according to an implementation. In this implementation, illustrated is a lifting propulsion mechanism 303 that may be used to generate sufficient force to lift the UAV discussed above with respect to FIGS. 1-2. In other implementations, the propulsion mechanism may be used as a maneuverability propulsion mechanism. The propeller blades 301 of the lifting propulsion mechanism are not mounted to a center shaft.

The lifting propulsion mechanism 303 includes a propeller assembly that includes a plurality of propeller blades 301-1, 301-2, 301-3, and 301-4 that are radially positioned. One end of each of the propeller blades 301 is coupled to an inner side of a propeller rim 309, as illustrated in the expanded view. The propeller rim is substantially circular, has a first diameter, extends around, and encompasses the propeller blades 301.

Coupled to an exterior or outer side of the propeller rim 309 is a plurality of magnets 311. The magnets may be any type of permanent magnet, such as neodymium iron boron (NdFeB), praseodymium, samarium cobalt (SmCo), alnico, and/or ceramic or ferrite magnets. Because the magnets are positioned around the perimeter of the propeller blades, the force needed to generate the same amount of torque as a tradition brushless motor is much less because of the increased leverage do the positioning of the magnets. Accordingly, the magnets may be smaller and lighter weight.

The opposing ends of the propeller blades may be coupled together, or as illustrated in FIG. 3, may be coupled to an inner rim 306. Because the external portion of the propeller blades generate most of the lifting force, they are rotating faster, the inner portion of the propeller blades may be removed and the blades coupled to an inner rim 306, thereby reducing weight of the propeller assembly and reducing noise generated by the propeller blades 301.

The propeller rim 309 and magnets 311 are positioned within and encompassed by a propeller rim enclosure 307. The propeller rim enclosure 307 is substantially circular, has a second diameter that is larger than the first diameter of the propeller rim 309, and extends around and encompasses the propeller rim 309.

Referring to the expanded view, the propeller rim enclosure 307 includes a perimeter wall 312, an upper wall 314, and a lower wall 316. The upper wall 314 is coupled to an upper edge of the perimeter wall at approximately a perpendicular angle and extends inward toward the propeller rim. The lower wall 316 is coupled to the lower edge of the perimeter wall 312 at approximately a perpendicular angle and extends inward toward the propeller rim. The perimeter wall 312, upper wall 314, and lower wall 316 form a cavity into which the propeller rim 309 is positioned.

Also positioned within the cavity and coupled to an inner side of the perimeter wall 312 is a plurality of electromagnets 313. A current is applied to the electromagnets 313 by the lifting propulsion controller, also known as an electronic speed control, so that the electromagnets 313 generate a magnetic field that causes the propeller rim to rotate. When the propeller rim rotates, the propeller blades coupled to the propeller rim also rotate, thereby generating a lifting force as the air passes over the propeller blades. The propulsion mechanism controller, discussed below with respect to FIG. 8, can control both the speed and direction of rotation of the propeller rim. As will be appreciated, the propeller assembly and the propeller rim enclosure are positioned such that the electromagnets are within a defined distance of the magnets so that the magnets are within the magnetic field generated by the electromagnets.

In some implementations, the propeller rim 309 is supported within the propeller rim enclosure by a plurality of propeller rim guides 308. The propeller rim guides 308 may be bearings, rails, grooves, etc. that secure the propeller rim 309 within the propeller rim enclosure 307 and allow the propeller rim 307 to rotate with respect to the propeller rim enclosure 307. In one implementation, a first set of propeller rim guides 308-1 may be coupled to an inner side of the upper wall and a second set of propeller rim guides 308-2 may be positioned on an inner side of the lower wall 316 such that the propeller rim 309 is positioned between the propeller rim guides 308.

The propeller rim enclosure 307 may be coupled to or otherwise mounted to the frame of a UAV 100, as illustrated in FIG. 1. When mounted, the propeller rim enclosure 307 remains stationary with respect to the propeller assembly and the propeller assembly rotates within the propeller rim enclosure.

In addition to the reduced torque required to generate the same amount of force by the propeller blades, the configuration of the lifting propulsion mechanism 303 provides other benefits as well. For example, because the propeller blades 301 are terminated and coupled into the propeller rim 307, the propeller blades do not have tips. By eliminating the tips of the propeller blades, the noise generated from the rotation of the propeller blades is reduced and tip vortices are reduced or eliminated. Still further, by positioning the propeller assembly such that the propeller rim 309 and magnets are within the cavity of the propeller rim enclosure 307, the propeller rim enclosure 307 dampens the noise generated by the rotation of the propeller assembly. In some implementations, the propeller rim enclosure may also include a protective shroud, such as a screen, that extends over the top and/or bottom of the propeller assembly so that the propeller assembly, including the propeller blades, is fully encompassed. By encompassing the propeller assembly with a protective shroud, it will prevent objects or debris from coming into contact with the propeller blades.

Figure 4:
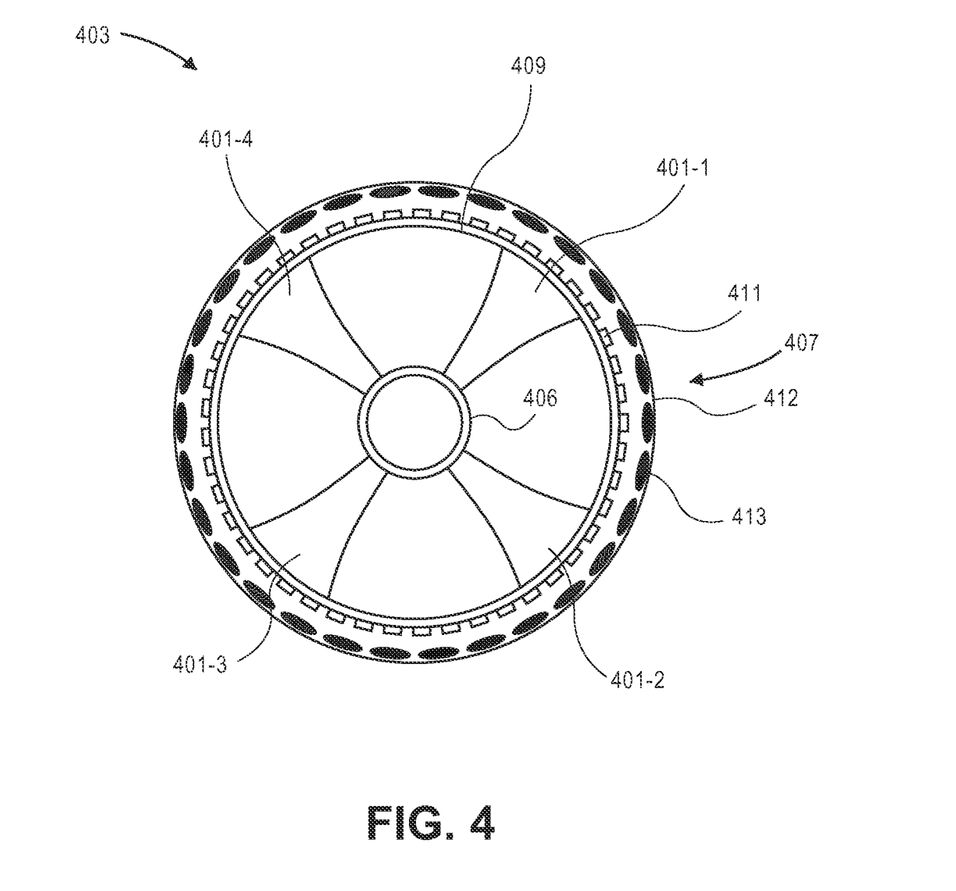
FIG. 4 is a block diagram of another top-down view of a circumferentially-driven propulsion mechanism, according to an implementation.

FIG. 4 is a block diagram of another top-down view of a circumferentially-driven propulsion mechanism, according to an implementation. In this example, the upper wall of the propeller rim enclosure 407 has been eliminated to enable illustration of the propeller rim 409, magnets 411, and electromagnets 413 positioned within the propeller rim enclosure 407 of the propulsion mechanism 403. As illustrated, the magnets 411 are coupled to an outer edge or perimeter of the propeller rim 409. In this example, the magnets are equally spaced and extend around the entire perimeter of the propeller rim 409.

The electromagnets 413 are coupled to an inner edge of the perimeter wall 412 of the propeller rim enclosure 407. In this example, the electromagnets 413 are equally spaced and extend around the entire inside of the perimeter wall 412.

The propeller blades 401-1, 401-2, 401-3, and 401-4 extend radially from the inner rim 406 and are coupled to the perimeter rim 409. While this example illustrates four propeller blades that are equally spaced, in other implementations there may be additional and/or fewer propeller blades. Likewise, the propeller blades need to be equally positioned.

Figure 5:
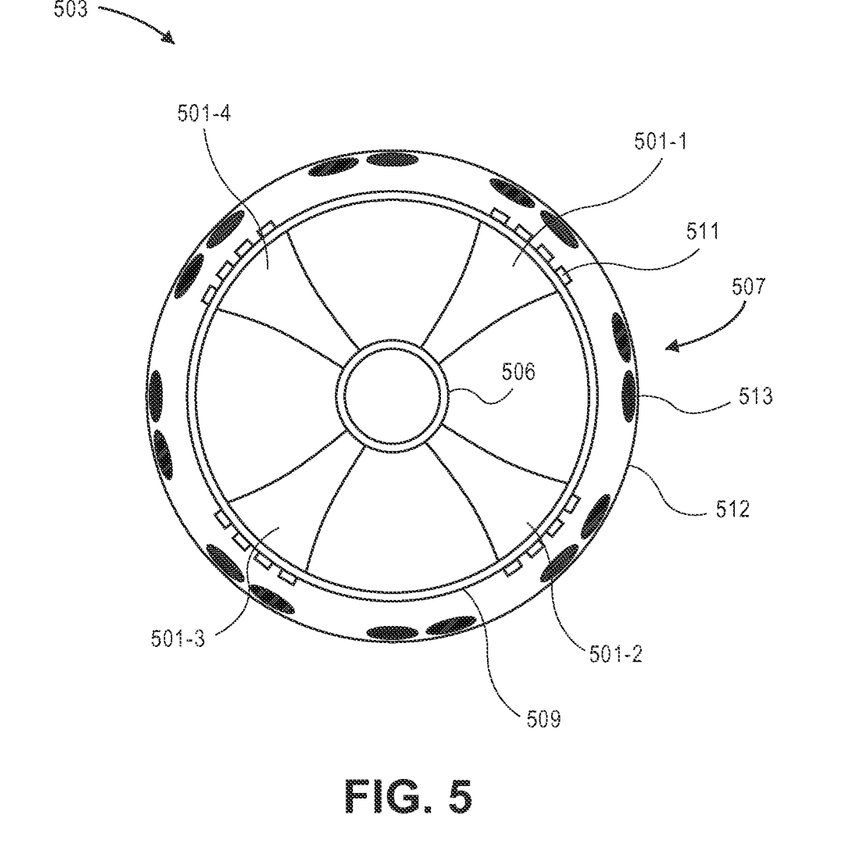
FIG. 5 is a block diagram of a top-down view of another configuration of a circumferentially-driven propulsion mechanism, according to an implementation.

In some implementations, there may be more than one propeller assembly positioned within the propeller rim enclosure. For example, two propeller assemblies, each of which includes propeller blades, propeller rims, and magnets, may be positioned within the cavity of the propeller rim enclosure 407. In such a configuration, the first propeller assembly may rotate in a first direction and the second propeller assembly may rotate in a second, opposite direction. In another implementation, the aerial vehicle may include multiple circumferentially-driven propulsion mechanisms 503 that are positioned adjacent one another. In such a configuration, a portion of the electromagnets may be shared between the circumferentially-driven propulsion mechanisms 503. In either configuration, the propellers of a first circumferentially-driven propulsion mechanism 503 may rotate in an opposite direction than the propellers of the second circumferentially-driven propulsion mechanism 503. As discussed above, by rotating the two sets of propeller blades in opposite directions, the angle of momentum generated by the two sets of propeller blades cancel out.

While the example illustrated in FIG. 4 describes the magnets and electromagnets being equally spaced and extending around the entire perimeter of the propeller rim and perimeter wall, other implementations may utilize different configurations. For example, FIG. 5 is a block diagram of a top-down view of another configuration of a circumferentially-driven propulsion mechanism 503, according to an implementation. In this configuration, the magnets are positioned along the outside propeller rim 509 such that they are opposite the coupling location of the propeller blades 501-1, 501-2, 501-3, and 501-4. In such a configuration, the total number of magnets utilized may be reduced, thereby reducing the weight of the propulsion mechanism 503. In other configurations, the magnets may be positioned at other locations on the propeller rim. For example, rather than positioning the magnets to correspond with the locations of the propeller blades, in other implementations, the magnets may be positioned along the propeller rim at areas where the propeller blades are not located.

In addition to altering the position and/or quantity of the magnets along the propeller rim, the position and/or quantity of the electromagnets 513 may likewise be adjusted, according to an implementation. For example, as illustrated in FIG.

5, rather than including electromagnets closely spaced and evenly distributed about the inside of the perimeter wall 512 of the propeller rim enclosure 507, the electromagnets 513 may be distributed into sectors or groups. For example, the electromagnets 513 may be distributed in pairs around the inside of perimeter wall 512 of the propeller rim enclosure 507. In other implementations, the magnets 511 and/or electromagnets 513 may be positioned at other locations and/or configurations. Likewise, the magnets 511 and/or electromagnets 513 do not need to be distributed in sectors or pairs. For example, the magnets 511 may be individually positioned around the outside of the propeller rim 509. In another example, rather than positioning the magnets on the outside of the propeller rim 509, the propeller blades 501 themselves, or a portion thereof, may be magnetic and operate as the magnets such that they rotate in response to a charge being applied to the electromagnets 513. For example, the ends of the propeller blades 501 closest to the electromagnets 513 may be formed of a magnet material.

In some implementations, the only constraining factor may be that, regardless of the position of the propeller assembly with respect to the propeller rim enclosure, at least one magnet is aligned with at least one electromagnet so that the propeller assembly will be caused to rotate when a current is applied to the electromagnets. In some implementations, the number of magnets 511 may be different from the number of electromagnets 513.

While the examples discussed above describe including the magnets on the propeller rim and the electromagnets on the propeller rim enclosure, in other implementations, the magnets and electromagnets may be reversed such that the magnets are placed on the inside of the perimeter wall of the propeller rim enclosure and the electromagnets are placed on the exterior of the propeller rim. In such a configuration, the electromagnets will rotate with the rotation of the propeller rim. Current may be provided to the electromagnets when coupled to the propeller rim via the propeller rim guides (e.g., bearings) that support and position the propeller rim within the propeller rim enclosure.

In still other implementations, rather than placing the magnets on the outer side of the propeller rim and placing the electromagnets on the inside of the perimeter wall of the propeller rim enclosure, in other implementations, the magnets may be positioned on an upper and/or lower edge of the propeller rim and the electromagnets placed on an inside of the upper wall and/or lower wall of the propeller rim enclosure. For example, the magnets may be placed on the upper edge of the propeller rim and the electromagnets may be placed on the inside of the upper wall of the propeller rim enclosure. The propeller rim may be supported by propeller rim guides, such as bearings that are positioned on the inside of the lower wall of the propeller rim enclosure. In such a configuration, the repelling forces generated by the magnets and the electromagnets when the electromagnets are active will not only cause the propeller rim to rotate but will also aid in maintaining the position of the propeller rim within the propeller rim enclosure.

In some implementations, rather than including a physical rail (e.g., bearings) that support the propeller rim within the cavity of the propeller rim enclosure, the magnets and electromagnets may be positioned such that the propeller assembly is magnetically levitated within the cavity of the propeller rim enclosure. For example, magnets may be placed on the upper edge and lower edge of the propeller rim and/or the propeller rim may be magnetic and the electromagnets 513 may be placed on the inside of the upper wall and the inside of the lower wall of the propeller rim enclosure. In such a configuration, when current is applied to the electromagnets, the repelling forces between the electromagnets and the magnets cause the propeller rim to be magnetically levitated and rotate within the propeller rim enclosure.

Figure 6:
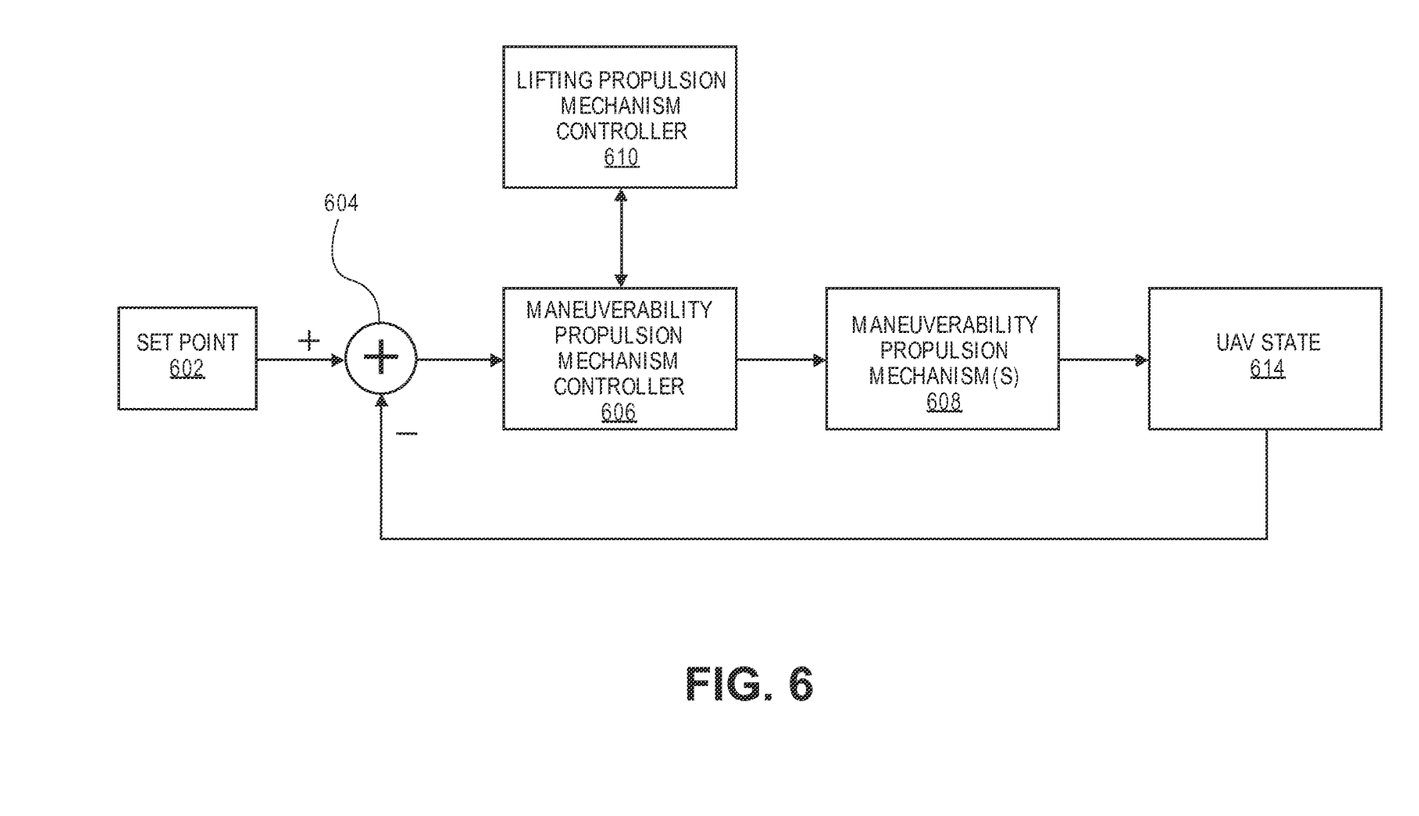
FIG. 6 is a block diagram illustrating the determination of forces to be generated by maneuverability propellers in response to a maneuverability command, according to an implementation.

FIG. 6 is a block diagram illustrating the determination of forces to be generated by maneuverability propulsion mechanism in response to a maneuverability command and the corresponding state information of the UAV, including the Euler angles, position, and velocity of the UAV, according to an implementation. A maneuverability command, which may be received from a remote source (e.g., controller) or from the UAV control system 110, etc., may include one or more of a pitch, yaw, roll, pitch rate, yaw rate, and/or roll rate, collectively referred to herein as a set point 602. The set point may then be provided to a summer 604. The summer 604 determines the error by computing the difference between the current yaw, pitch, roll, yaw rate, pitch rate, and roll rate of the UAV (collectively the "plant variable") and the set point 602. The error is then provided to the controller 606.

The controller 606 utilizes the error from the summer 604 along with the perceived gravity provided by the lifting mechanism controller 610 to produce propulsion mechanism commands. As discussed above, the perceived gravity is determined based on the difference between the actual gravitational force and the vertical force generated by the lifting propulsion mechanism(s) controller 610 of the UAV. In some implementations, the perceived gravity may be approximately zero. The propulsion mechanism commands identify the speed of rotation, pitch, direction of rotation and/or angle for each of the propulsion mechanisms.

The propulsion mechanism commands are received by the propulsion maneuverability mechanism(s) 608 and the rotational speed of each is updated based on the propulsion mechanism commands. In some implementations, the propulsion mechanism commands may also be provided back to the lifting propulsion mechanism controller 610. For example, if the maneuverability propulsion mechanism commands include a vertical component that will result in the UAV gaining altitude if there no perceived gravity, the lifting propulsion mechanism controller 610 may receive those commands and reduce the rotational speed of the lifting propulsion mechanism(s) so that the total vertical forces remain approximately constant and the UAV maintains the commanded altitude.

As the UAV is maneuvered according to the propulsion mechanism commands, the UAV state 614 is updated and provided as a feedback to the summer 604.

Figure 7:
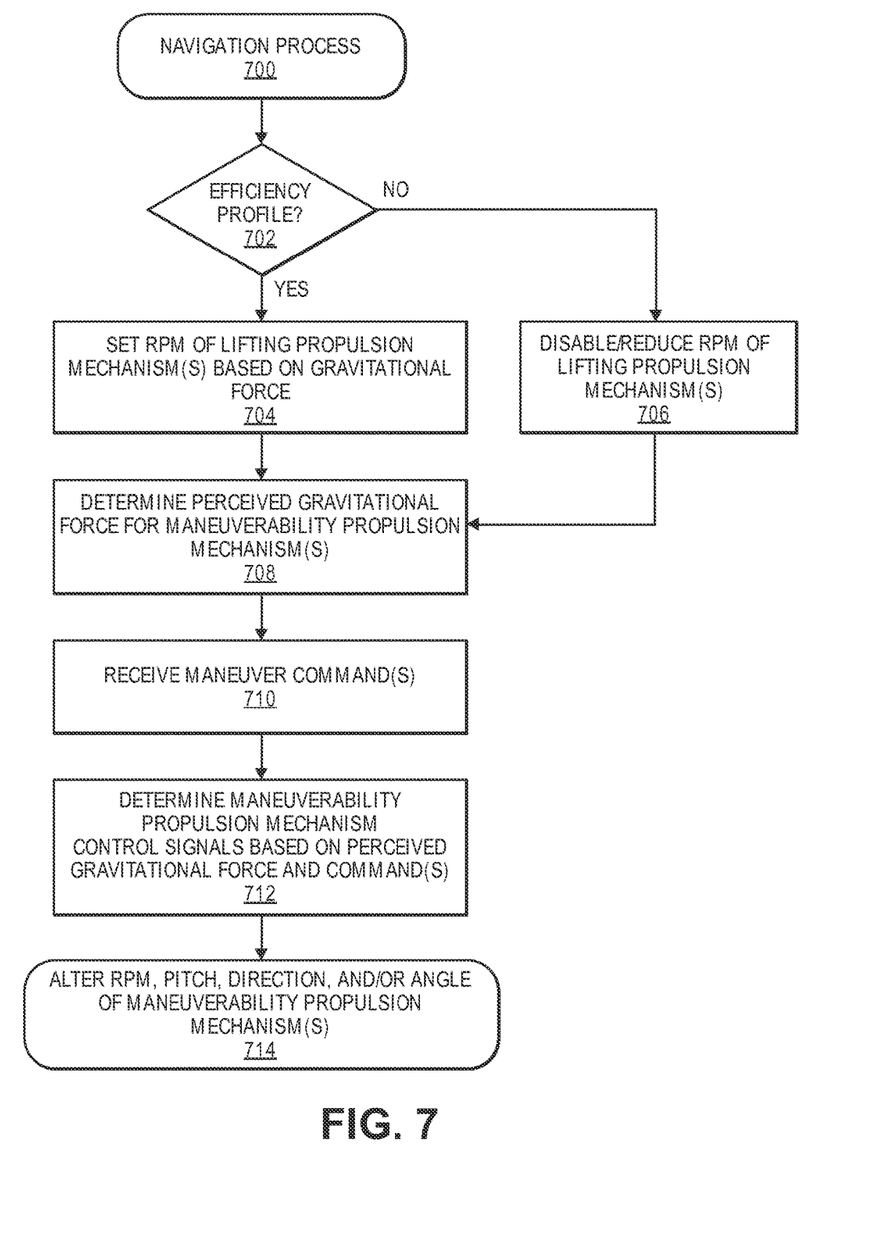
FIG. 7 is a flow diagram illustrating an example navigation process, according to an implementation.

FIG. 7 is a flow diagram illustrating an example navigation process 700, according to an implementation. The example process of FIG. 7 and each of the other processes discussed herein may be implemented in hardware, software, or a combination thereof. In the context of software, the described operations represent computer-executable instructions stored on one or more computer-readable media that, when executed by one or more processors, perform the recited operations. Generally, computer-executable instructions include routines, programs, objects, components, data structures, and the like that perform particular functions or implement particular abstract data types.

The computer-readable media may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. Finally, the order in which the operations are described is not intended to be construed as a limitation, and any number of the described operations can be combined in any order and/or in parallel to implement the routine.

The example navigation process 700 begins by determining if the UAV is to be operating in an efficiency profile or an agility profile, as in 702. In the agility profile, the UAV may be configured for high agility. In comparison, in the efficiency profile, the UAV may be configured for increased power efficiency. A profile may be determined and selected based at least in part on the position or location of the UAV. For example, the position of the UAV may include the altitude of the UAV, a velocity of the UAV, whether other objects are within a close proximity of and/or approaching the UAV, etc. Objects may be considered within a close proximity of a UAV if they are within a defined distance (e.g., 50 ft., 100 ft.) of the UAV. If the UAV is traveling at a high altitude and there are no or few objects, it may be determined that the UAV should use an efficiency profile. In comparison, during landing, take off, or when operating in areas with several objects nearby, it may be determined that the UAV should operate using an agility profile.

If it is determined that the UAV is to operate according to an efficiency profile, the rotational speed (rpm) of the lifting propulsion mechanism is determined based on the gravitational force applied to the UAV, as in 704. For example, if the UAV has a mass of 20.00 kg, the gravitational force is 196.133 N. As such, the rpm of the lifting propulsion mechanism is set so that the lifting propulsion mechanism generates a force that is approximately equal and opposite the gravitational force.

If it is determined that the UAV is not to operate according to the efficiency profile (e.g., it is to operate according to an agility profile) the lifting propulsion mechanism is disengaged and/or the rpm is reduced, as in 706. Lifting and navigating the UAV with just the maneuverability propulsion mechanism(s) increases the agility of the UAV, but consumes more power. In some implementations, there may be a transition between an efficiency profile and an agility profile, where the rpm of the lifting propulsion mechanism is reduced so that the lifting forces necessary to maintain altitude of the UAV are generated using both the lifting propulsion mechanism and the maneuverability propulsion mechanism(s).

Upon setting the rpm of the lifting propulsion mechanism, the perceived gravitational force, from the perspective of the maneuverability propulsion mechanism(s) is determined, as in 708. In some implementations, if the lifting propulsion mechanism is generating a force that is approximately equal and opposite to the gravitational force acting on the UAV, the perceived gravitational force from the perspective of the UAV is approximately zero. In such an implementation, the maneuverability propulsion mechanism(s) only need to generate forces sufficient to stabilize the UAV, alter the attitude of the UAV, and/or alter the directional speed of the UAV.

As part of the navigation process 700, a maneuver command is received, which may include one or more of a pitch command, roll command, a yaw command or a thrust command, as in 710. The maneuver command may be received from a remote source, such as a remote computing component, a remote controller, etc., and/or generated by the UAV control system. For example, if the UAV is to navigate a determined path, the UAV control system may generate maneuver commands to be executed so that the UAV remains and/or follows the determined path.

In response to receiving the maneuver command, maneuverability propulsion mechanism control signals are determined for each maneuverability propulsion mechanism based on the perceived gravitational forces and the maneuver command, as in 712. For example, if the maneuver command is a command to move in a horizontal direction at 20.0 m/s and the UAV is operating according to an efficiency profile such that the perceived gravitational force acting upon the UAV is approximately zero, the example process 700 will determine the horizontal forces needed to navigate the UAV in the horizontal direction at a speed of 20.0 m/s.

Based on the determined maneuverability propulsion mechanism control signals, the rpm of one or more of the maneuverability propulsion mechanisms, the pitch of one or more of the maneuverability propulsion mechanisms, the direction of one of more of the maneuverability propulsion mechanisms and/or the angle of one or more of the maneuverability propulsion mechanisms may be altered to generate a force corresponding to the maneuverability propulsion mechanism control signals determined at block 712, as in 714. The alterations made to the maneuverability propulsion mechanism may be the same or different for each maneuverability propulsion mechanism.

Figure 8:
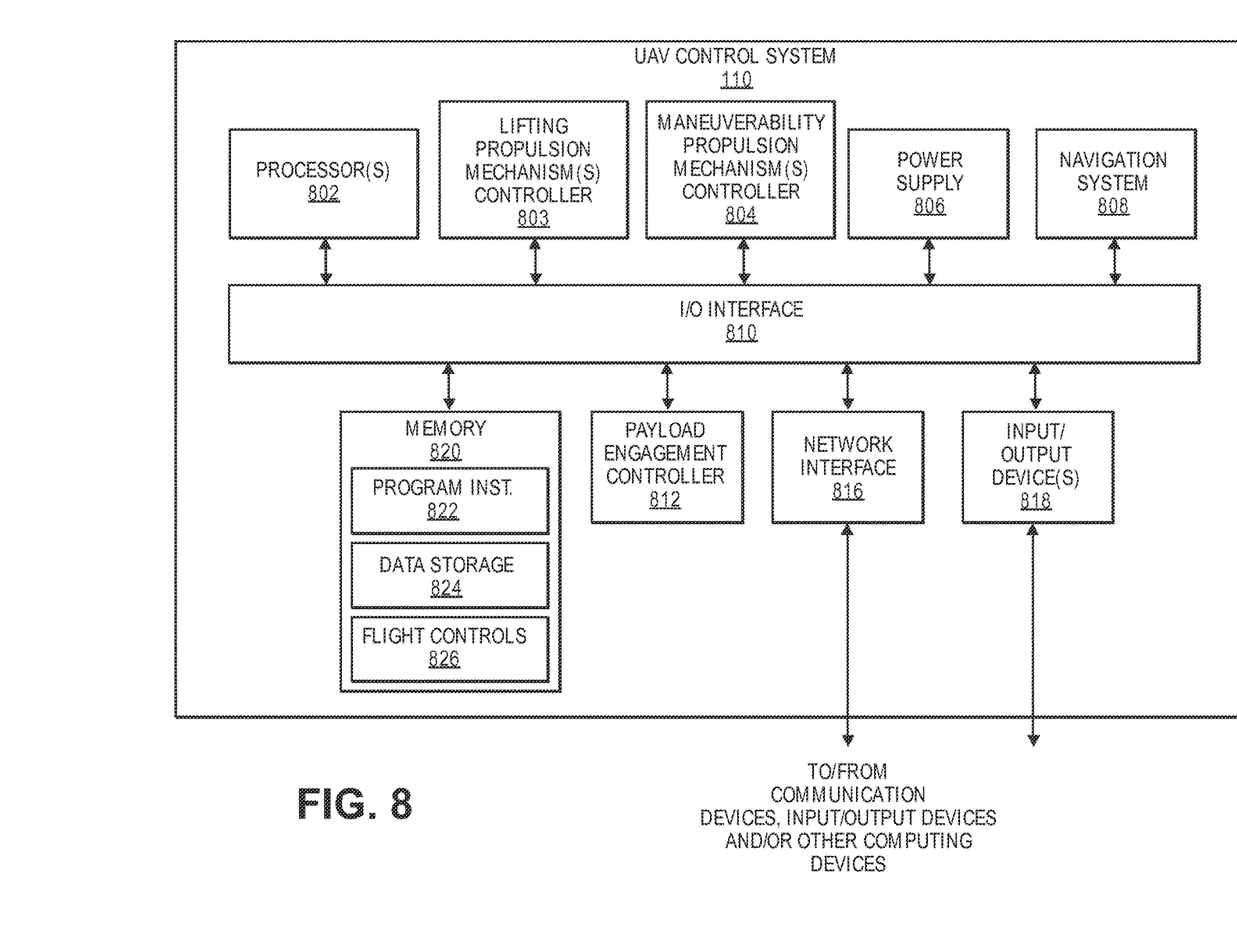
FIG. 8 is a block diagram illustrating various components of an unmanned aerial vehicle control system, according to an implementation.

FIG. 8 is a block diagram illustrating an example UAV control system 110 of the UAV 100. In various examples, the block diagram may be illustrative of one or more aspects of the UAV control system 110 that may be used to implement the various systems and methods discussed herein and/or to control operation of the UAV 100. In the illustrated implementation, the UAV control system 110 includes one or more processors 802, coupled to a memory, e.g., a non-transitory computer readable storage medium 820, via an input/output (I/O) interface 810. The UAV control system 110 also includes lifting propulsion mechanism controller 803, maneuverability propulsion mechanism controllers 804, such as electronic speed controls (ESCs), power supply modules 806 and/or a navigation system 808. The UAV control system 110 further includes a payload engagement controller 812, a network interface 816, and one or more input/output devices 818.

In various implementations, the UAV control system 110 may be a uniprocessor system including one processor 802, or a multiprocessor system including several processors 802 (e.g., two, four, eight, or another suitable number). The processor(s) 802 may be any suitable processor capable of executing instructions. For example, in various implementations, the processor(s) 802 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 802 may commonly, but not necessarily, implement the same ISA.

The non-transitory computer readable storage medium 820 may be configured to store executable instructions, data, flight paths, profiles, flight control parameters, center of gravity information, and/or data items accessible by the processor(s) 802. In various implementations, the non-transitory computer readable storage medium 820 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described herein, are shown stored within the non-transitory computer readable storage medium 820 as program instructions 822, data storage 824, and flight controls 826, respectively. In other implementations, program instructions, data, and/or flight controls may be received, sent, or stored upon different types of computer-accessible media, such as non-transitory media, or on similar media separate from the non-transitory computer readable storage medium 820 or the UAV control system 110. Generally speaking, a non-transitory, computer readable storage medium may include storage media or memory media such as magnetic or optical media, e.g., disk or CD/DVD-ROM, coupled to the UAV control system 110 via the I/O interface 810. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via the network interface 816.

In one implementation, the I/O interface 810 may be configured to coordinate I/O traffic between the processor(s) 802, the non-transitory computer readable storage medium 820, and any peripheral devices, the network interface or other peripheral interfaces, such as input/output devices 818. In some implementations, the I/O interface 810 may perform any necessary protocol, timing or other data transformations to convert data signals from one component (e.g., non-transitory computer readable storage medium 820) into a format suitable for use by another component (e.g., processor(s) 802). In some implementations, the I/O interface 810 may include support for devices attached through various types of peripheral buses, such as a variant of the Peripheral Component Interconnect (PCI) bus standard or the Universal Serial Bus (USB) standard, for example. In some implementations, the function of the I/O interface 810 may be split into two or more separate components, such as a north bridge and a south bridge, for example. Also, in some implementations, some or all of the functionality of the I/O interface 810, such as an interface to the non-transitory computer readable storage medium 820, may be incorporated directly into the processor(s) 802.

The maneuverability propulsion mechanism(s) controller 804 communicates with the navigation system 808 and adjusts the rotational speed of each maneuverability propulsion mechanisms, for example by altering the current that is applied to the maneuverability propulsion mechanisms. Likewise, the lifting propulsion mechanism(s) controller 803 communicates with the navigation system 808 and adjusts the rotational speed of the lifting propulsion mechanism(s), for example by altering the current that is applied to the lifting propulsion mechanism(s).

The navigation system 808 may include a global positioning system (GPS), indoor positioning system (IPS), or other similar system and/or sensors that can be used to navigate the UAV 100 to and/or from a location. The payload engagement controller 812 communicates with the actuator(s) or motor(s) (e.g., a servo motor) used to engage and/or disengage items.

The network interface 816 may be configured to allow data to be exchanged between the UAV control system 110, other devices attached to a network, such as other computer systems (e.g., remote computing resources), and/or with UAV control systems of other UAVs. For example, the network interface 816 may enable wireless communication between the UAV 100 and a UAV control system that is implemented on one or more remote computing resources. For wireless communication, an antenna of the UAV or other communication components may be utilized. As another example, the network interface 816 may enable wireless communication between numerous UAVs. In various implementations, the network interface 816 may support communication via wireless general data networks, such as a Wi-Fi network. For example, the network interface 816 may support communication via telecommunications networks, such as cellular communication networks, satellite networks, and the like.

Input/output devices 818 may, in some implementations, include one or more displays, imaging devices, thermal sensors, infrared sensors, time of flight sensors, accelerometers, pressure sensors, weather sensors, etc. Multiple input/output devices 818 may be present and controlled by the UAV control system 110. One or more of these sensors may be utilized to assist in landing as well as to avoid obstacles during flight.

As shown in FIG. 8, the memory may include program instructions 822, which may be configured to implement the example routines and/or sub-routines described herein. The data storage 824 may include various data stores for maintaining data items that may be provided for determining flight paths, landing, identifying locations for disengaging items, etc. In various implementations, the parameter values and other data illustrated herein as being included in one or more data stores may be combined with other information not described or may be partitioned differently into more, fewer, or different data structures. In some implementations, data stores may be physically located in one memory or may be distributed among two or more memories.

Those skilled in the art will appreciate that the UAV control system 110 is merely illustrative and is not intended to limit the scope of the present disclosure. In particular, the computing system and devices may include any combination of hardware or software that can perform the indicated functions. The UAV control system 110 may also be connected to other devices that are not illustrated, or instead may operate as a stand-alone system. In addition, the functionality provided by the illustrated components may, in some implementations, be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated UAV control system 110. Some or all of the system components or data structures may also be stored (e.g., as instructions or structured data) on a non-transitory, computer-accessible medium or a portable article to be read by an appropriate drive, various examples of which are described herein. In some implementations, instructions stored on a computer-accessible medium separate from the UAV control system 110 may be transmitted to the UAV control system 110 via transmission media or signals such as electrical, electromagnetic, or digital signals, conveyed via a communication medium such as a wireless link. Various implementations may further include receiving, sending, or storing instructions and/or data implemented in accordance with the foregoing description upon a computer-accessible medium. Accordingly, the techniques described herein may be practiced with other UAV control system configurations.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A propulsion apparatus, comprising:
an enclosure having a first radius, the enclosure including a plurality of electromagnets positioned on an inner surface of the enclosure;
a plurality of propeller blades positioned within the enclosure;
a plurality of magnets positioned along an outer end of each of the plurality of propeller blades such that the plurality of magnets are adjacent to the electromagnets; and
a controller configured to at least cause a current to be provided to at least one of the plurality of electromagnets, wherein the plurality of propeller blades are configured to at least rotate with respect to the enclosure in response to the current being provided to at least one of the plurality of electromagnets;
wherein the outer end of each of the plurality of propeller blades is coupled to a propeller rim;
wherein the plurality of magnets are distributed along the propeller rim with an uneven spacing.

2. The propulsion apparatus of claim 1, wherein the plurality of magnets are incorporated into the plurality of propeller blades such that at least a portion of the plurality of propeller blades is magnetic.

3. The propulsion apparatus of claim 1, wherein the plurality of magnets are positioned within the enclosure.

4. The propulsion apparatus of claim 1, wherein the enclosure is configured to at least reduce a noise generated by a rotation of the plurality of propeller blades.

5. A propulsion apparatus, comprising:
an enclosure, including:
a perimeter wall having a first diameter; and
a plurality of electromagnets coupled to the perimeter wall;
a propeller assembly positioned within the enclosure, the propeller assembly including:
a plurality of propeller blades;
a propeller rim having a second diameter and surrounding the plurality of propeller blades; and
a plurality of magnets coupled to the propeller rim and distributed along the propeller rim with an uneven spacing.

6. The propulsion apparatus of claim 5, wherein:
the propeller assembly is configured to at least rotate within the enclosure in response to an electrical current being applied to at least one of the plurality of electromagnets; and
the plurality of propeller blades is configured to at least generate a lifting force in proportion to a speed of the rotation of the propeller rim.

7. The propulsion apparatus of claim 5, further comprising:
a propeller rim guide positioned along the enclosure to support the propeller rim.

8. The propulsion apparatus of claim 7, wherein the propeller rim guide comprises at least one of:

a plurality of bearings between which the propeller rim is positioned such that the propeller rim can rotate within the enclosure;
a rail positioned within the enclosure that secures the propeller rim within the enclosure and allows the propeller rim to rotate within the enclosure; or
a plurality of magnets that provide magnetic levitation of the propeller rim.

9. The propulsion apparatus of claim 5, wherein the plurality of magnets are spaced proximate an outer end of each of the plurality of propeller blades.

10. The propulsion apparatus of claim 5, wherein the plurality of electromagnets are spaced in groups within the enclosure.

11. The propulsion apparatus of claim 5, wherein the plurality of electromagnets are coupled to an interior of the enclosure and positioned a defined distance from the plurality of magnets.

12. The propulsion apparatus of claim 5, wherein the propeller assembly further includes an inner propeller rim coupled to an inner end of each of the plurality of propeller blades.

13. The propulsion apparatus of claim 5, further comprising:
a protective shroud that encloses the propeller assembly.

14. The propulsion apparatus of claim 5, wherein the plurality of magnets are positioned along the propeller rim with a spacing that corresponds to coupling locations where the propeller blades couple to the propeller rim.

15. An apparatus, comprising:
an enclosure having a substantially circular shape, the enclosure including a plurality of electromagnets;
a plurality of propeller blades positioned within the enclosure;
a plurality of magnets positioned along outer ends of the plurality of propeller blades, and adjacent to the plurality of electromagnets;
a propeller rim having a substantially circular shape and encompassing the plurality of propeller blades, wherein the outer ends of the plurality of propeller blades are coupled to the propeller rim; and
a controller configured to at least cause a current to be provided to at least one of the plurality of electromagnets, wherein the plurality of propeller blades is configured to at least rotate with respect to the enclosure in response to the current being provided to at least one of the plurality of electromagnets;
wherein the plurality of magnets are distributed along the propeller rim with an uneven spacing.

16. The apparatus of claim 15, wherein the plurality of magnets are incorporated into the plurality of propeller blades such that at least a portion of the plurality of propeller blades is magnetic.

17. The apparatus of claim 15, wherein the enclosure is configured to at least reduce a noise generated by a rotation of the plurality of propeller blades by enclosing the outer ends of the plurality of propeller blades.

18. The apparatus of claim 15, wherein the propeller rim is positioned within a perimeter of the enclosure.

* * * * *